(12) United States Patent
Zhu

(10) Patent No.: US 12,565,250 B1
(45) Date of Patent: Mar. 3, 2026

(54) LOCKING DEVICE FOR FOLDING CART

(71) Applicant: Wanjuan Zhu, Puning (CN)

(72) Inventor: Wanjuan Zhu, Puning (CN)

(*) Notice: Subject to any disclaimer, the term of this patent is extended or adjusted under 35 U.S.C. 154(b) by 0 days.

(21) Appl. No.: 19/329,518

(22) Filed: Sep. 15, 2025

(51) Int. Cl.
      *B62B 3/02* (2006.01)
(52) U.S. Cl.
      CPC .......... *B62B 3/022* (2013.01); *B62B 2205/20* (2013.01)
(58) Field of Classification Search
      CPC .......... B62B 3/022; B62B 3/02; B62B 3/025; B62B 3/003; B62B 3/004; B62B 2205/20; B62B 2501/065; B65D 11/1813; B65D 11/18; B65D 11/1806; Y10T 292/0926; Y10T 292/0969; Y10T 403/32271
      See application file for complete search history.

(56) References Cited

U.S. PATENT DOCUMENTS

| | | | | | |
|---|---|---|---|---|---|
| 4,923,079 | A | * | 5/1990 | Foy .......................... | B65D 19/18 |
| | | | | | 220/326 |
| D545,025 | S | | 6/2007 | Elden | |
| 7,726,705 | B2 | * | 6/2010 | Kim ........................ | B60N 3/083 |
| | | | | | 292/169.18 |
| 8,579,147 | B2 | * | 11/2013 | Dubois .............. | B65D 11/1833 |
| | | | | | 220/666 |
| 9,422,082 | B2 | * | 8/2016 | Nolan ..................... | B65D 11/18 |
| 9,428,205 | B2 | * | 8/2016 | Jackson ................ | B62B 3/1476 |
| 9,476,235 | B2 | * | 10/2016 | Jian ...................... | B65D 25/005 |
| 11,338,835 | B2 | | 5/2022 | Elden | |

| | | | |
|---|---|---|---|
| 11,565,735 | B2 | 1/2023 | Elden |
| 12,103,576 | B2 | 10/2024 | Elden |
| 12,275,446 | B2 | 4/2025 | Elden |
| 12,304,546 | B1 | 5/2025 | Elden |

(Continued)

FOREIGN PATENT DOCUMENTS

| | | |
|---|---|---|
| CN | 303947734 S | 11/2016 |
| CN | 107668883 A | 2/2018 |

(Continued)

OTHER PUBLICATIONS

Amazon.com, Inc. Olympia Tools 85-010 Grand Pack-N-Roll Portable Tools Carrier with Telescopic Handle, 80 Lb. Load Capacity, Black. Product, Olympia Tools, 2009, pp. 1-8 [retrieved on Oct. 17, 2025]. Retrieved from: https://www.amazon.com/dp/B000UZ0P7I.

(Continued)

*Primary Examiner* — Steve Clemmons
(74) *Attorney, Agent, or Firm* — Bayramoglu Law Offices LLC

(57) ABSTRACT

The provided is a locking device for a folding cart, including a button mechanism and a locking member, where the button mechanism includes a movable portion and multiple fixing hooks; the movable portion is slidably disposed on a first panel body of the folding cart; the locking member is connected to a second panel body of the folding cart; the first panel body is hinged to the second panel body; and the movable portion is able to switch between an initial state and a pushed state. When the movable portion is in the initial state, a side panel is effectively locked, and the locked state of the side panel is effectively maintained without user operation. This design improves the stability of the side panel in an unfolded state, preventing the folding cart from self-unlocking during use, and enhancing the stability of the folding cart in an unfolded state.

9 Claims, 10 Drawing Sheets

(56)          References Cited

U.S. PATENT DOCUMENTS

| | | | | |
|---|---|---|---|---|
| 2009/0057307 A1* | 3/2009 | Jung | .......................... | A45F 3/04 |
| | | | | 220/6 |
| 2009/0064595 A1* | 3/2009 | Yates | .................. | E05B 65/0014 |
| | | | | 49/281 |

FOREIGN PATENT DOCUMENTS

| | | | | | |
|---|---|---|---|---|---|
| CN | 304632396 S | 5/2018 | | | |
| CN | 305015819 S | 1/2019 | | | |
| CN | 210337966 U | 4/2020 | | | |
| CN | 305693210 S | 4/2020 | | | |
| CN | 305723950 S | 4/2020 | | | |
| CN | 305733464 S | 4/2020 | | | |
| CN | 216995343 U | 7/2022 | | | |
| KR | 20230002255 U | * | 11/2023 | .............. | B62B 3/02 |

OTHER PUBLICATIONS

Amazon.com, Inc. Olympia Tools 85-015 Grand Folding Storage Rolling Cart with Telescopic Handle for Easy Transportation, Weight Capacity up to 150 Pounds, Olympia Tools, 2017, pp. 1-8 [retrieved on Oct. 17, 2025]. Retrieved from: https://www.amazon.com/dp/B076D9XG7T.

Amazon.com, Inc. FELICON Selorss Foldable Utility Cart Folding Portable Rolling Crate Handcart with Durable Heavy Duty Plastic Telescoping Handle Collapsible 4 Rotate Wheels for Travel Shop Move Luggage Office(Black), FELICON, 2019, pp. 1-10 [retrieved on Oct. 17, 20257]. Retrieved from: https://www.amazon.com/dp/B07YFFPK7B.

\* cited by examiner

LOCKING DEVICE FOR FOLDING CART

TECHNICAL FIELD

The present disclosure relates to the technical field of folding carts, and in particular to a locking device for a folding cart.

BACKGROUND

Folding carts are portable handling tools designed with a folding structure. Their foldable body structure allows them to reduce in size, saving space and making it easy for users to store and carry.

During use, the folding cart must be unfolded and locked to prevent its body structure from folding or deforming. Existing folding carts utilize a locking rod structure or a sliding lock structure to lock foldable side panels. However, the locking rod structure or the sliding lock structure carries a risk of self-unlocking during use, leading to an unstable unfolded state of the folding cart. Furthermore, both processes of locking and unlocking the side panels of the folding cart require the user to continuously drive the movement of the locking rod structure or the sliding lock structure. This makes the folding cart difficult to operate and results in poor user experience.

SUMMARY

(I) Technical Problem to Be Solved

In view of the above-mentioned drawbacks and deficiencies of the prior art, the present disclosure provides a locking device for a folding cart.

(II) Technical Solution

To achieve the above objective, the locking device for a folding cart provided by the present disclosure includes a button mechanism and a locking member, where the button mechanism includes a movable portion and multiple fixing hooks disposed on the movable portion; the movable portion is slidably disposed on a first panel body of the folding cart; the locking member is connected to a second panel body of the folding cart; and the first panel body is hinged to the second panel body; and the movable portion is able to switch between an initial state and a pushed state; when the movable portion is in the initial state, the multiple fixing hooks are engaged with the locking member, and the first panel body and the second panel body of the folding cart to form a rigid side panel; and when the movable portion is in the pushed state, the multiple fixing hooks move along a sliding direction of the movable portion and disengage from the locking member, allowing the first panel body and the second panel body to rotate relative to each other and fold.

Optionally, the locking member includes a fixing plate and multiple fixing arms; the fixing plate is connected to the second panel body; and first ends of the multiple fixing arms are connected to the fixing plate; and when the movable portion is in the initial state, the multiple fixing arms are engaged with the multiple fixing hooks in a one-to-one correspondence, and the multiple fixing arms abut against the first panel body.

Optionally, second ends of the multiple fixing arms are connected by a reinforcing member.

Optionally, the first panel body is provided with an elastic member; the elastic member abuts against the movable portion; and the elastic member is able to drive the movable portion to reset from the pushed state to the initial state.

Optionally, the fixing hook is connected to the movable portion to form a U-shaped groove; and a top of the fixing hook forms an inclined surface.

Optionally, the movable portion is provided with a first restricting portion; and when the movable portion is in the initial state, the first restricting portion abuts against the first panel body to restrict further movement of the movable portion.

Optionally, the movable portion is provided with a second restricting portion; and when the movable portion is in the pushed state, the second restricting portion abuts against the first panel body to restrict further movement of the movable portion.

Optionally, the button mechanism further includes a push portion; the push portion is disposed on the second restricting portion; a top surface of the first panel body is provided with a recess; and the push portion is disposed in the recess.

Optionally, the movable portion includes a sliding plate; the first panel body is provided with a sliding groove; and the sliding plate is slidably connected to the sliding groove.

Optionally, the movable portion further includes a guide plate; the first panel body is provided with a guide groove; and the guide plate is slidably connected to the guide groove.

A folding cart includes a locking device and a pair of oppositely disposed side panels, where each of the side panels includes a first panel body and a second panel body hinged to each other;

the locking device includes a button mechanism and a locking member; the button mechanism includes a movable portion and multiple fixing hooks disposed on the movable portion; the movable portion is slidably disposed on the first panel body; and the locking member is fixedly disposed on the second panel body; and the movable portion is able to switch between an initial state and a pushed state; when the movable portion is in the initial state, the multiple fixing hooks are engaged with the locking member, and the first panel body and the second panel body are coplanar, allowing the first panel body and the second panel body to form a rigid side panel, thereby placing the folding cart in an unfolded state; and when the movable portion is in the pushed state, the multiple fixing hooks move along a sliding direction of the movable portion and disengage from the locking member, allowing the first panel body and the second panel body to rotate relative to each other and fold inward, thereby placing the folding cart in a folded state.

(III) Beneficial Effects

When the movable portion is in the initial state, the side panel is effectively locked, and the locked state of the side panel is effectively maintained without user operation. This design improves the stability of the side panel in the unfolded state, preventing the folding cart from self-unlocking during use, and enhancing the stability of the folding cart in the unfolded state. Pushing the movable portion switches the movable portion to the pushed state. At this time, the locked state between the first panel body and the second panel body is released, and the first panel body and the second panel body can rotate relative to each other and fold. The push-to-unlock operation is simple and improves the user experience.

REFERENCE NUMERALS

I. first panel body; and II. second panel body;
1. button mechanism;
11. movable portion; 111. first restricting portion; 112. second restricting portion; 113. sliding plate; 114. sliding groove; 115. guide plate; and 116. guide groove;
12. fixing hook; 121. U-shaped groove; and 122. inclined surface;
13. push portion; and 14. recess;
2. locking member; 21. fixing plate; 22. fixing arm; and 23. reinforcing member; and
3. elastic member.

DETAILED DESCRIPTION OF THE EMBODIMENTS

To facilitate a better understanding of the present disclosure, the present disclosure is described in detail below with reference to the drawings and specific embodiments. The terms such as "upper" and "lower" mentioned herein are based on the orientations shown in FIG. 1.

Although the accompanying drawings show exemplary embodiments of the present disclosure, it should be understood that the present disclosure may be implemented in various forms and should not be limited to the embodiments set forth herein. The embodiments are provided for a more thorough understanding of the present disclosure, so as to make the scope of the present disclosure be fully conveyed to those skilled in the art.

The present disclosure provides a locking device for a folding cart. The locking device is configured to lock a foldable side panel of the folding cart in an unfolded state, enabling the foldable side panel to form a rigid side panel, thereby maintaining the folding cart in the unfolded state.

Figure 1:
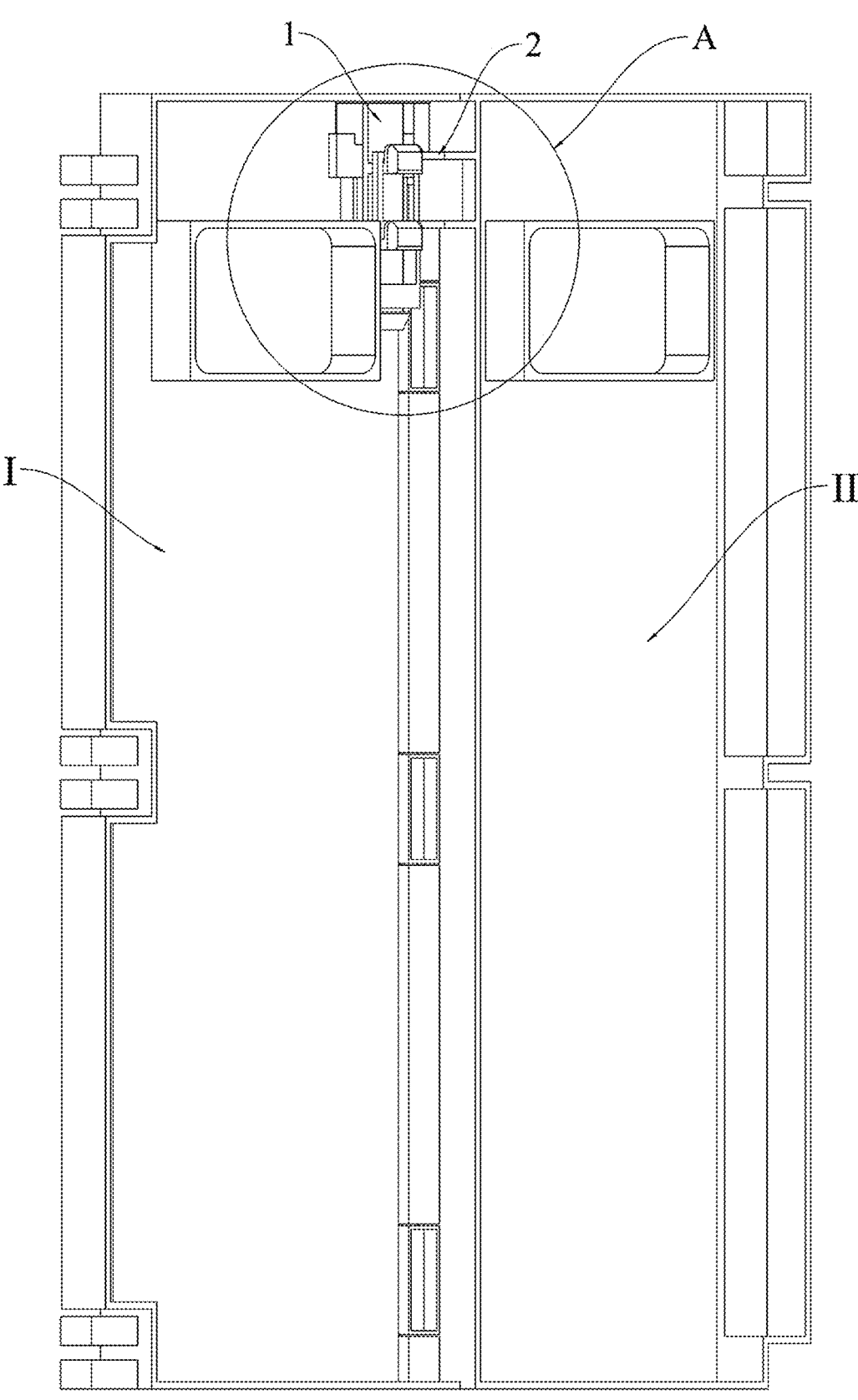
FIG. 1 is a structural view of a locking device for a folding cart according to an embodiment of the present disclosure.

As shown in FIG. 1, the locking device includes button mechanism 1 and locking member 2. The button mechanism 1 includes movable portion 11 and multiple fixing hooks 12 disposed on the movable portion 11. The movable portion 11 is slidably disposed on first panel body I of the folding cart. When the first panel body I is placed vertically, the movable portion 11 is able to slide vertically within a restricted range. The locking member 2 is connected to second panel body II of the folding cart. The first panel body I is hinged to the second panel body II. When the movable portion 11 slides vertically within the restricted range, the movable portion 11 switches between an initial state and a pushed state. Specifically, when the movable portion 11 is at an uppermost position, the movable portion 11 is in the initial state, and the multiple fixing hooks 12 are engaged with the locking member 2. Through the restricting action of the movable portion 11, the first panel body I and the second panel body II are coplanar, allowing the first panel body I and the second panel body II of the folding cart to form a rigid side panel. At this time, the side panel is in a locked state, and the folding cart is maintained in the unfolded state. When the side panel is in the locked state, the movable portion 11 is driven downward to a lowermost position. At this time, the movable portion 11 is in the pushed state, and the fixing hooks move downward with the movable portion 11 until the fixing hooks 12 disengage from the locking member 2. After all the fixing hooks 12 are separated from the locking member 2, the side panel is unlocked. At this time, the side panel is in an unlocked state, and the first panel body I and the second panel body II can rotate relative to each other and fold until they coincide.

When the movable portion 11 is in the initial state, the side panel is effectively locked, and the locked state of the side panel is effectively maintained without user operation. This design improves the stability of the side panel in the unfolded state, preventing the folding cart from self-unlocking during use, and enhancing the stability of the folding cart in the unfolded state. Pushing the movable portion 11 switches the movable portion 11 to the pushed state. At this time, the locked state between the first panel body I and the second panel body II is released, and the first panel body I and the second panel body II can rotate relative to each other and fold. The push-to-unlock operation is simple and improves the user experience.

Figure 2:
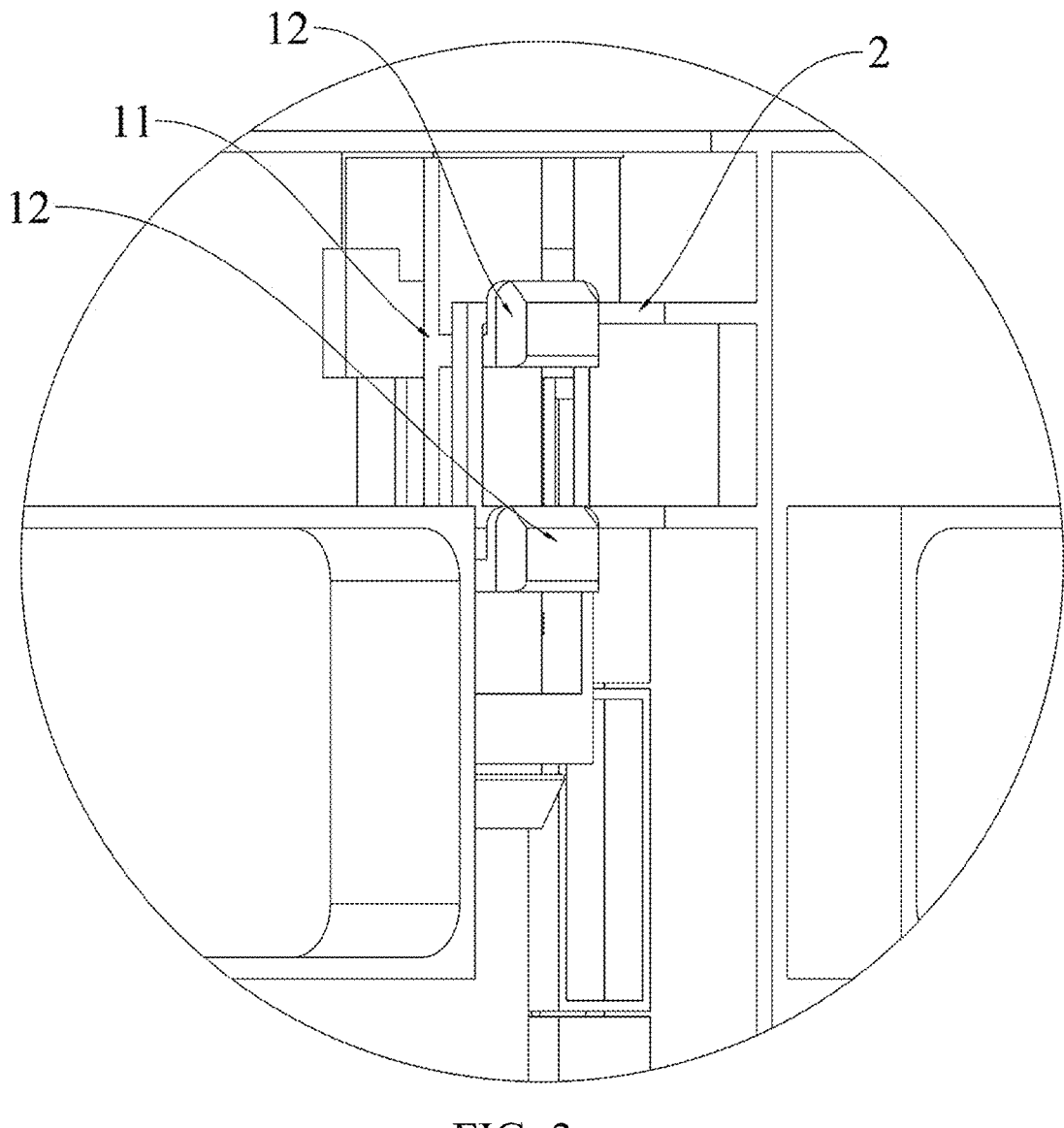
FIG. 2 is an enlarged view of A shown in FIG. 1.

As shown in FIG. 2, the locking member 2 includes fixing plate 21 and multiple fixing arms 22. The fixing plate 21 is connected to the second panel body II. First ends of the multiple fixing arms 22 are connected to the fixing plate 21. The fixing plate 21 and the fixing arms 22 can form an integral structure to increase the strength of the locking member 2. When the movable portion 11 is in the initial state, the multiple fixing arms 22 are engaged with the multiple fixing hooks 12 in a one-to-one correspondence, increasing stability and preventing the side panel from automatically unlocking during the use of the folding cart. At this time, the multiple fixing arms 22 extend into an area where the first panel body I is located and abut against the first panel body I. The fixing arms 22 cooperate with the fixing hooks 12 to restrict the first panel body I and prevent it from rotating. The first panel body I and the second panel body II are coplanar, achieving continuous locking of the side panel.

Figure 3:
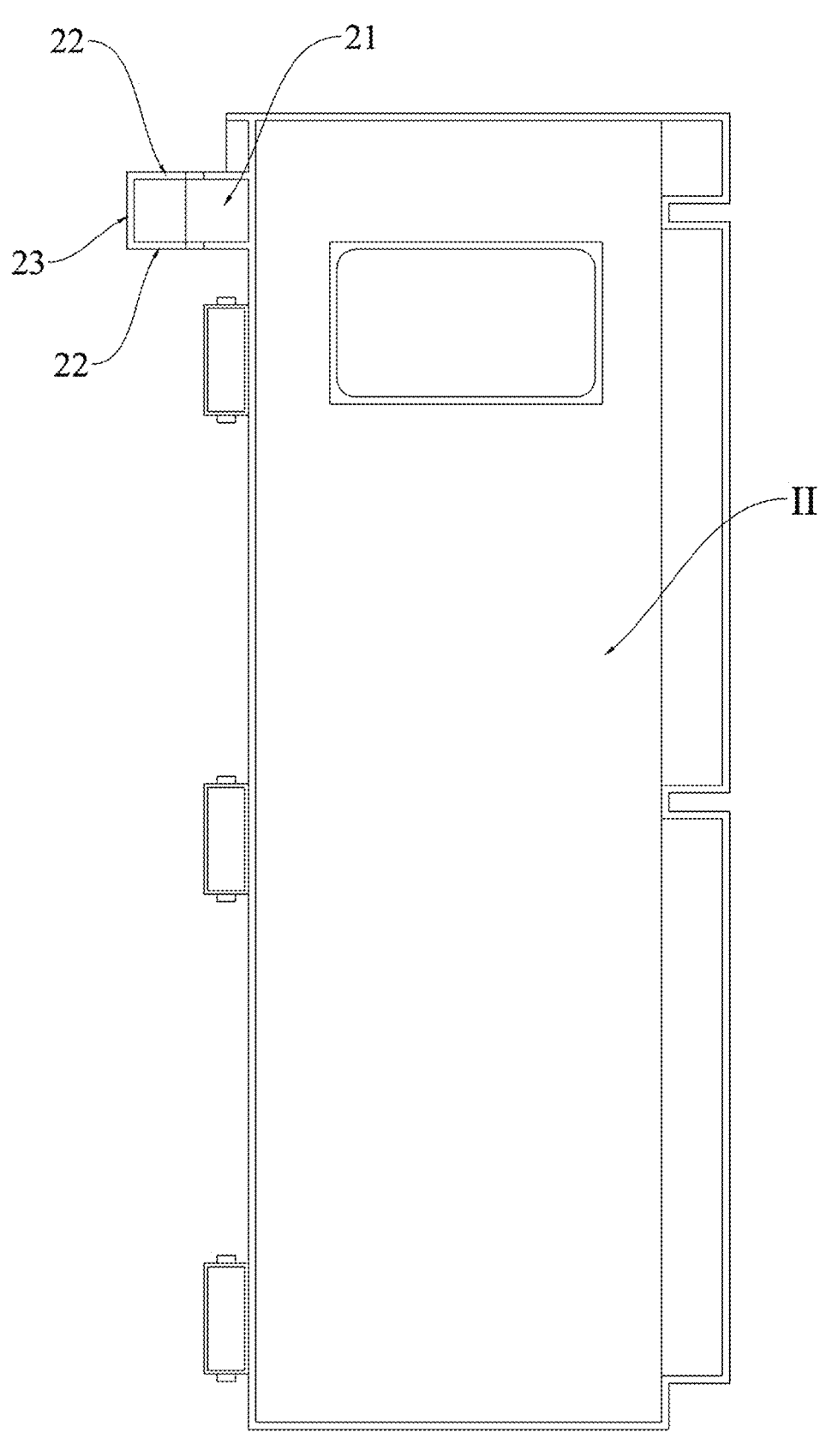
FIG. 3 is a structural view of a locking member of the locking device for a folding cart according to an embodiment of the present disclosure.

As shown in FIG. 3, second ends of the multiple fixing arms 22 are connected by reinforcing member 23, causing the multiple fixing arms 22 to be connected to each other to form a frame structure. The fixing hooks 12 pass through the frame structure and engage with the fixing arms 22 to complete the locking. This design increases the strength of the fixing arms 22, reduces the risk of the first panel body I or the second panel body II disengaging from the fixing hooks 12 due to deformation of the fixing arms 22 under external force, and improves the stability of the first panel body I and the second panel body II in the locked state.

Figure 4:
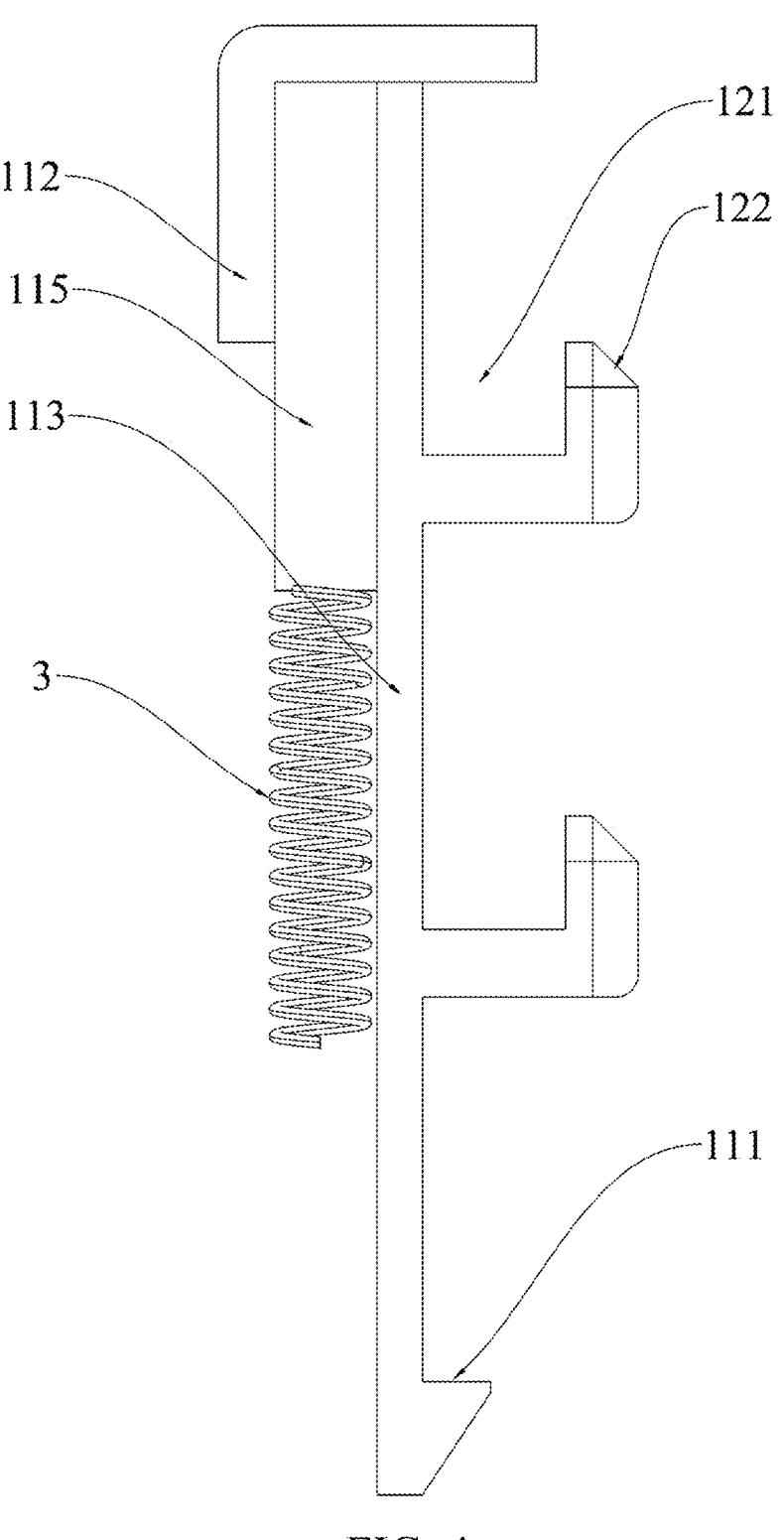
FIG. 4 is a structural view of a button mechanism of the locking device for a folding cart according to an embodiment of the present disclosure.
Figure 5:
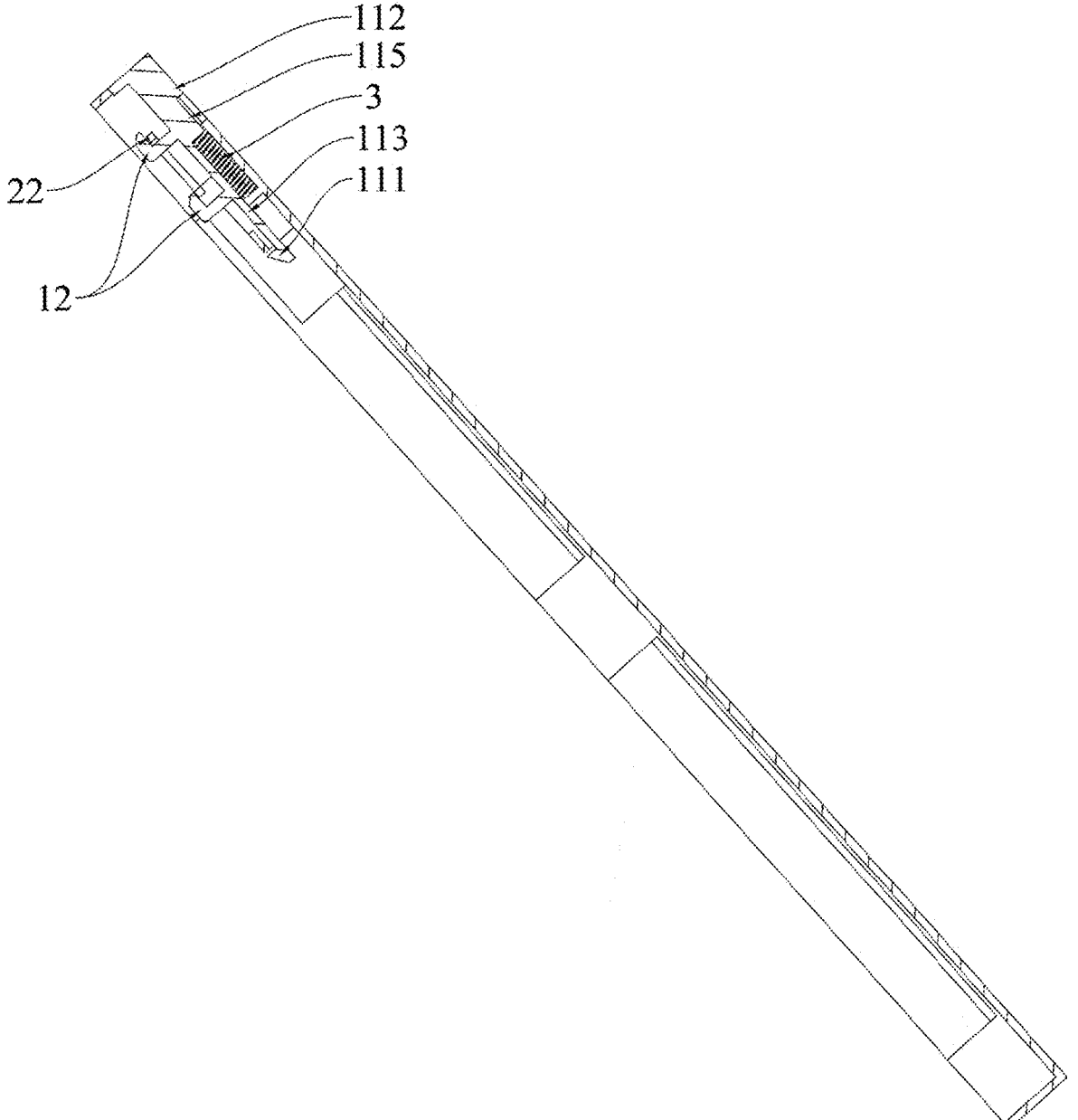
FIG. 5 is a cross-sectional view of a first panel body of the locking device for a folding cart according to an embodiment of the present disclosure.

As shown in FIG. 4 and FIG. 5, the first panel body I is provided with elastic member 3. The elastic member 3 abuts against the movable portion 11. The elastic member 3 can be a spring but is not limited to a spring. When the movable portion 11 needs to switch from the initial state to the pushed state, the user pushes the movable portion 11, thereby overcoming an elastic force of the elastic member 3, and driving the movable portion 11 downward to the pushed state. When the movable portion 11 needs to reset from the pushed state to the initial state, the user only needs to release the movable portion 11. The movable portion 11 automatically elastically resets from the pushed state to the initial state under the action of the elastic member 3, improving the convenience of user operation.

As shown in FIG. 4, the fixing hook 12 is connected to the movable portion 11 to form U-shaped groove 121. A top of the fixing hook 12 forms inclined surface 122. Specifically, when the side panel is in the locked state, the user pushes the movable portion 11, such that the movable portion 11 moves downward to the pushed state. At this time, the fixing hooks 12 completely disengage from the fixing arms 22, and the side panel switches to the unlocked state. The first panel body I and the second panel body II can rotate freely. When the first panel body I or the second panel body II is rotated to a certain angle, the movable portion 11 is released, such that the movable portion 11 is elastically reset. When the side panel is in the unlocked state, the first panel body I or the second panel body II is rotated until the top inclined surface 122 of the fixing hook 12 contacts the fixing arm 22. Then, the first panel body I or the second panel body II is further rotated to the same plane. During this process, the fixing arm 22 moves along the inclined surface 122 of the fixing hook 12. The fixing hook 12 is pushed downward to the pushed state by the squeezing action of the fixing arm 22. After the fixing arm 22 passes a highest point of the fixing hook 12, the movable portion 11 is elastically reset, and the fixing arm 22 is engaged with the fixing hook 12.

As shown in FIG. 5, the movable portion 11 is provided with first restricting portion 111. When the movable portion 11 is in the initial state, the first restricting portion 111 abuts against the first panel body I to restrict further movement of the movable portion 11, preventing the movable portion 11 from continuing to move upward under the action of the elastic member 3. The movable portion 11 is provided with second restricting portion 112. When the movable portion 11 is in the pushed state, the second restricting portion 112 abuts against the first panel body I to restrict further movement of the movable portion 11, preventing the movable portion 11 from continuing to move downward excessively and causing damage. Under the action of the first restricting portion 111 and the second restricting portion 112, the movable portion 11 can only move up and down within a set range.

Figure 6:
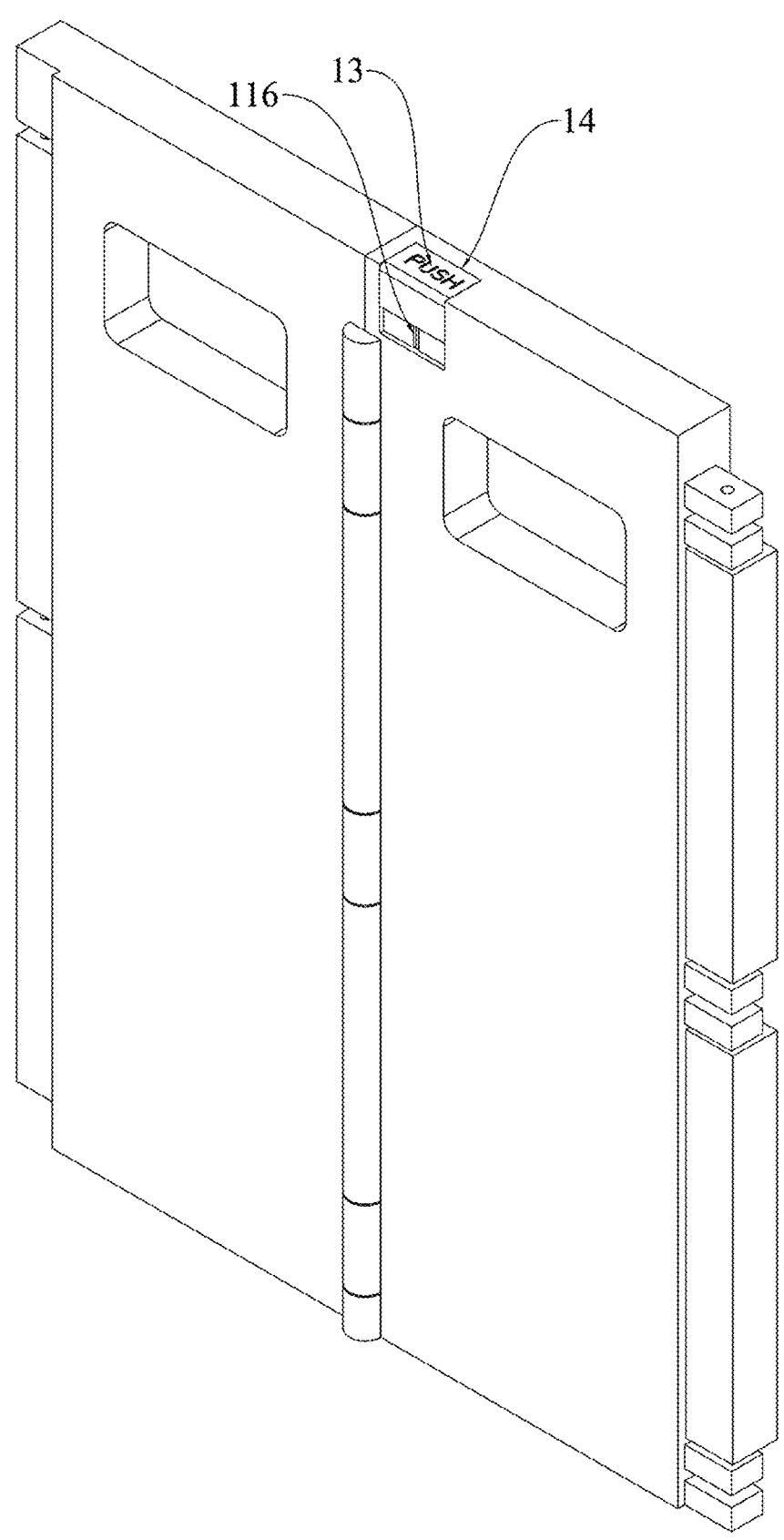
FIG. 6 is a structural view of a side panel of the locking device for a folding cart according to an embodiment of the present disclosure.

As shown in FIG. 6, the button mechanism 1 further includes push portion 13. The push portion 13 is disposed on the second restricting portion 112. A top surface of the first panel body I is provided with recess 14. The push portion 13 is disposed in the recess 14 in the form of a button. The user drives the movement of the movable portion 11 by pushing the push portion 13, further improving operational convenience.

Figure 7:
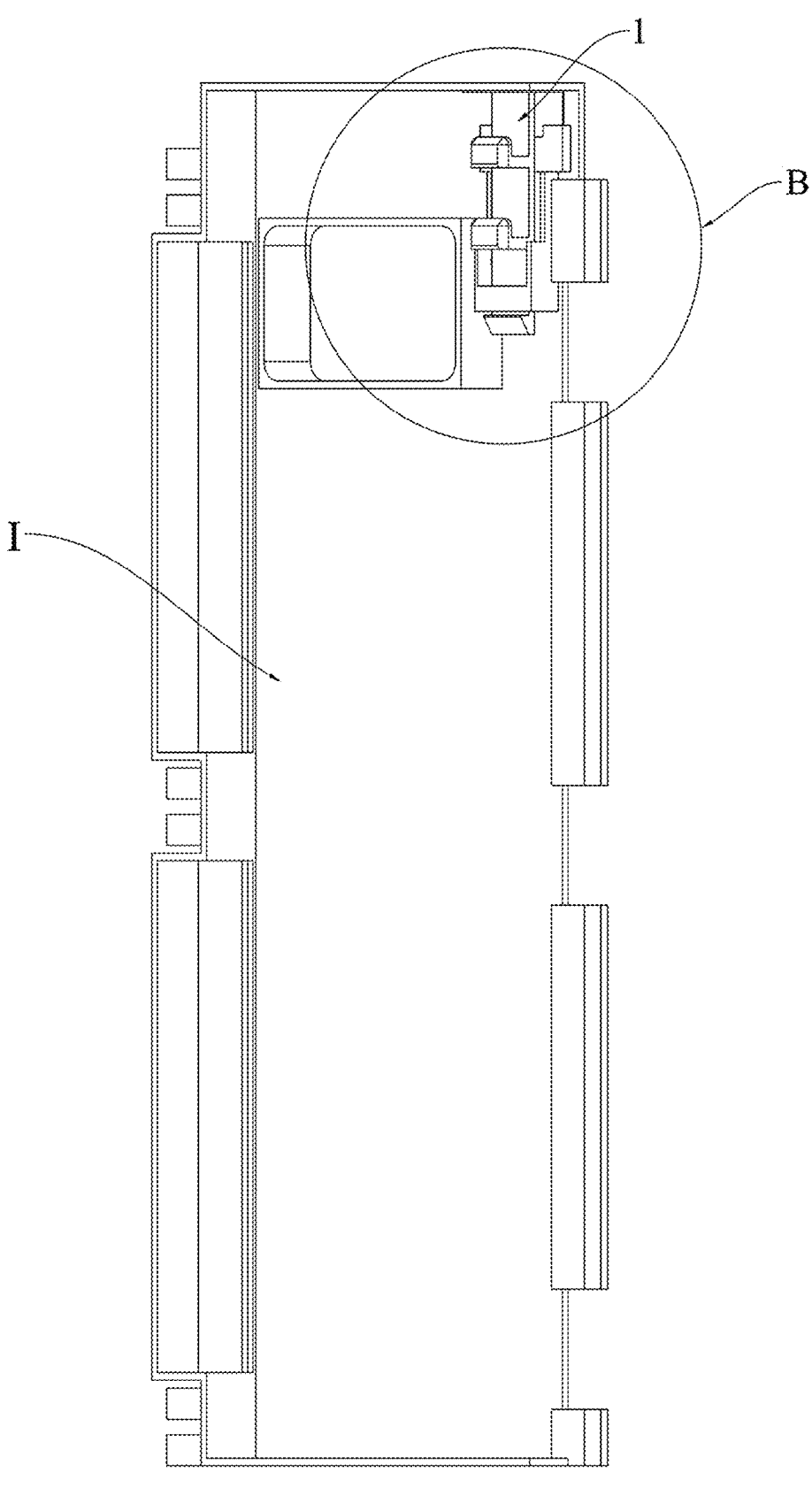
FIG. 7 is a schematic diagram of mounting the button mechanism of the locking device for a folding cart according to an embodiment of the present disclosure.
Figure 8:
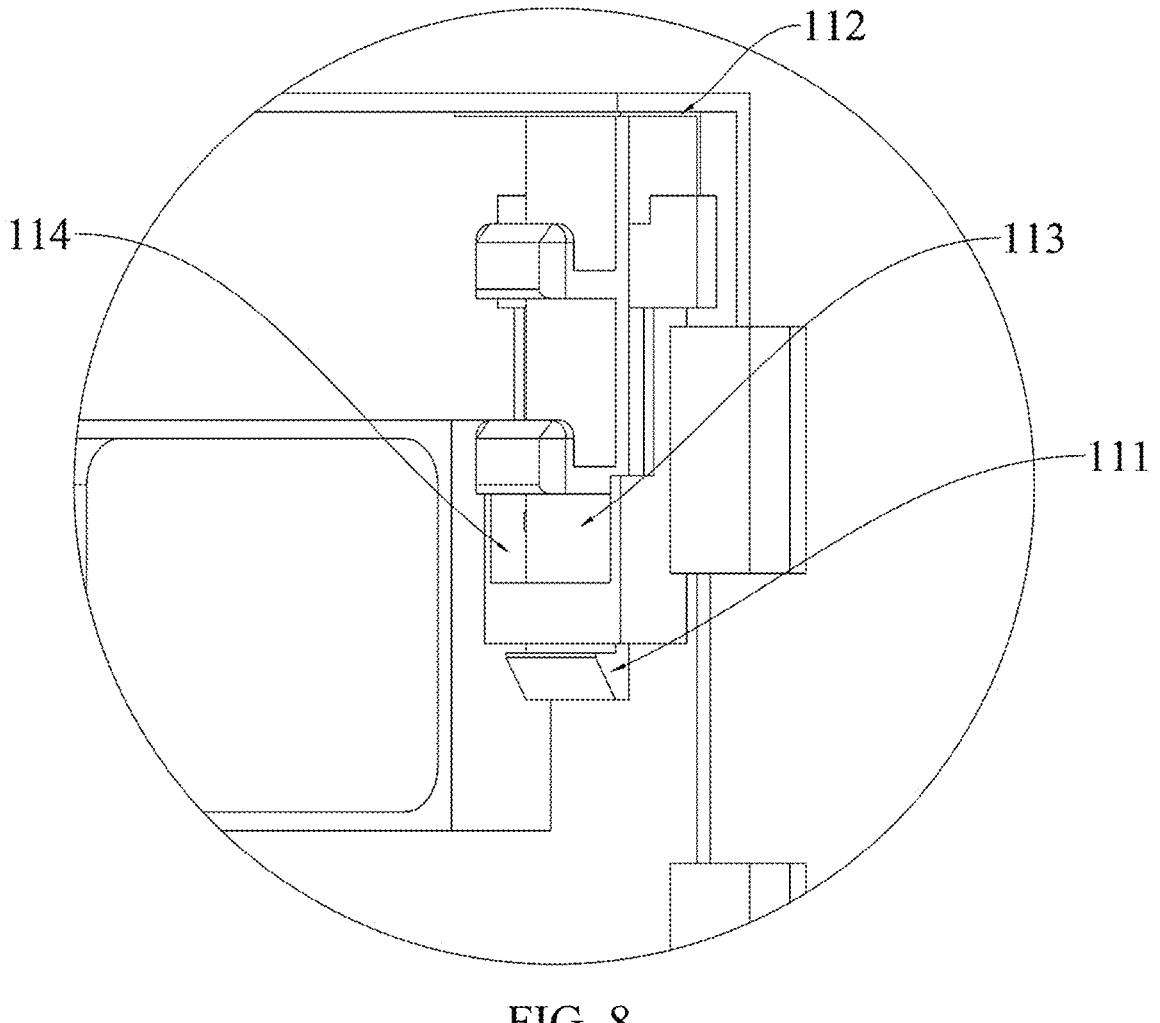
FIG. 8 is an enlarged view of B shown in FIG. 7.

As shown in FIG. 7 and FIG. 8, the movable portion 11 includes sliding plate 113. The fixing hook 12 is connected to the sliding plate 113 to form the U-shaped groove 121. The first panel body I is provided with sliding groove 114. The sliding plate 113 is disposed in the sliding groove 114. The sliding plate 113 is restricted by the sliding groove 114 and can only slide along an axial direction of the sliding groove 114. Furthermore, as shown in FIG. 4 and FIG. 6, the movable portion 11 further includes guide plate 115. The first panel body I is provided with guide groove 116 matching the guide plate 115. The guide plate 115 is disposed in the guide groove 116. An axial direction of the guide groove 116 is parallel to the axial direction of the sliding groove 114. The guide plate 115 is restricted by the guide groove 116 and can only slide along the axial direction of the guide groove 116, improving the stability of the movement of the sliding plate 113. Applying lubricant to the guide groove 116 and the sliding groove 114 can reduce wear on the sliding plate 113.

Figure 9:
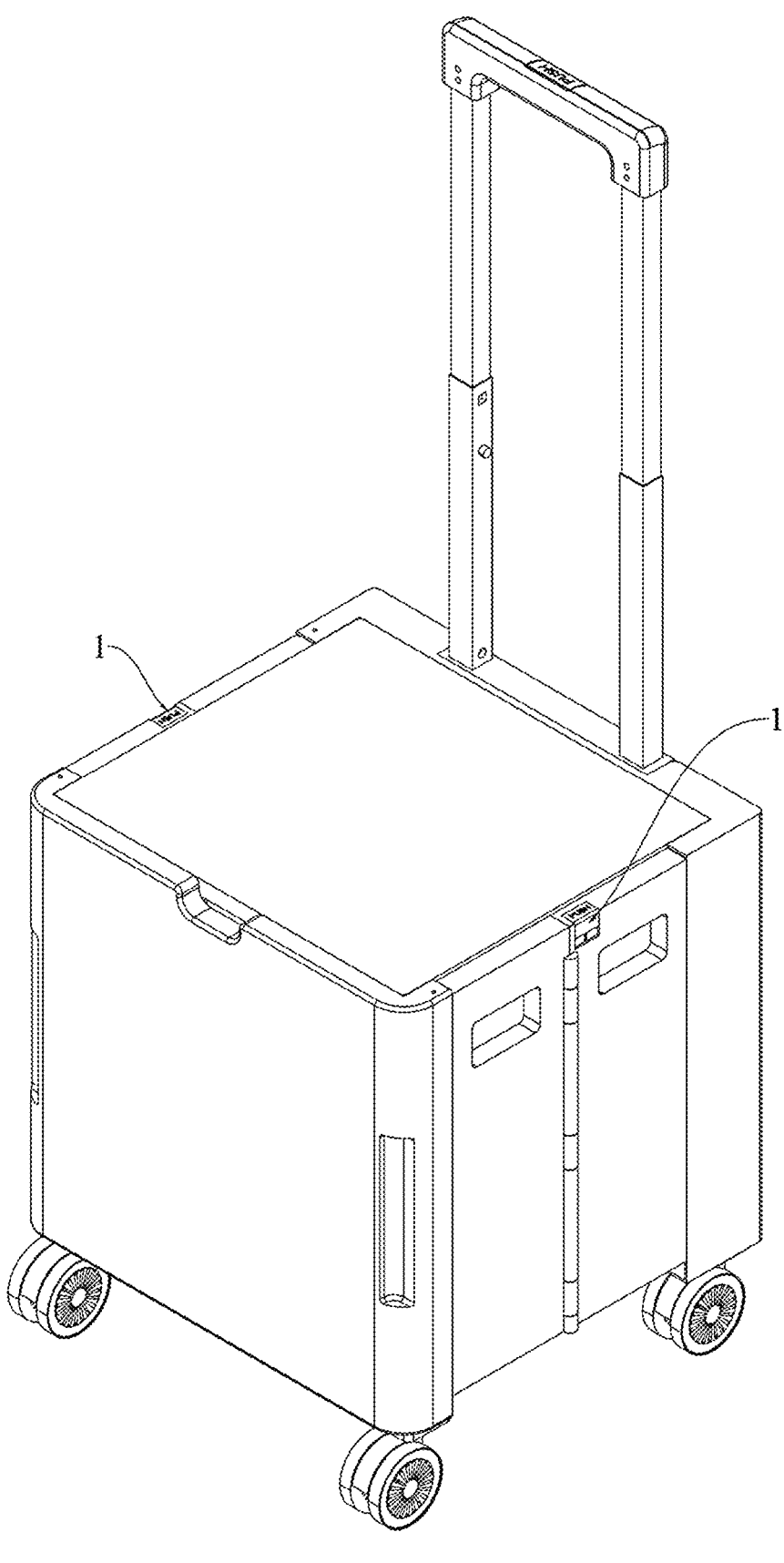
FIG. 9 is a structural view of the folding cart according to an embodiment of the present disclosure.
Figure 10:
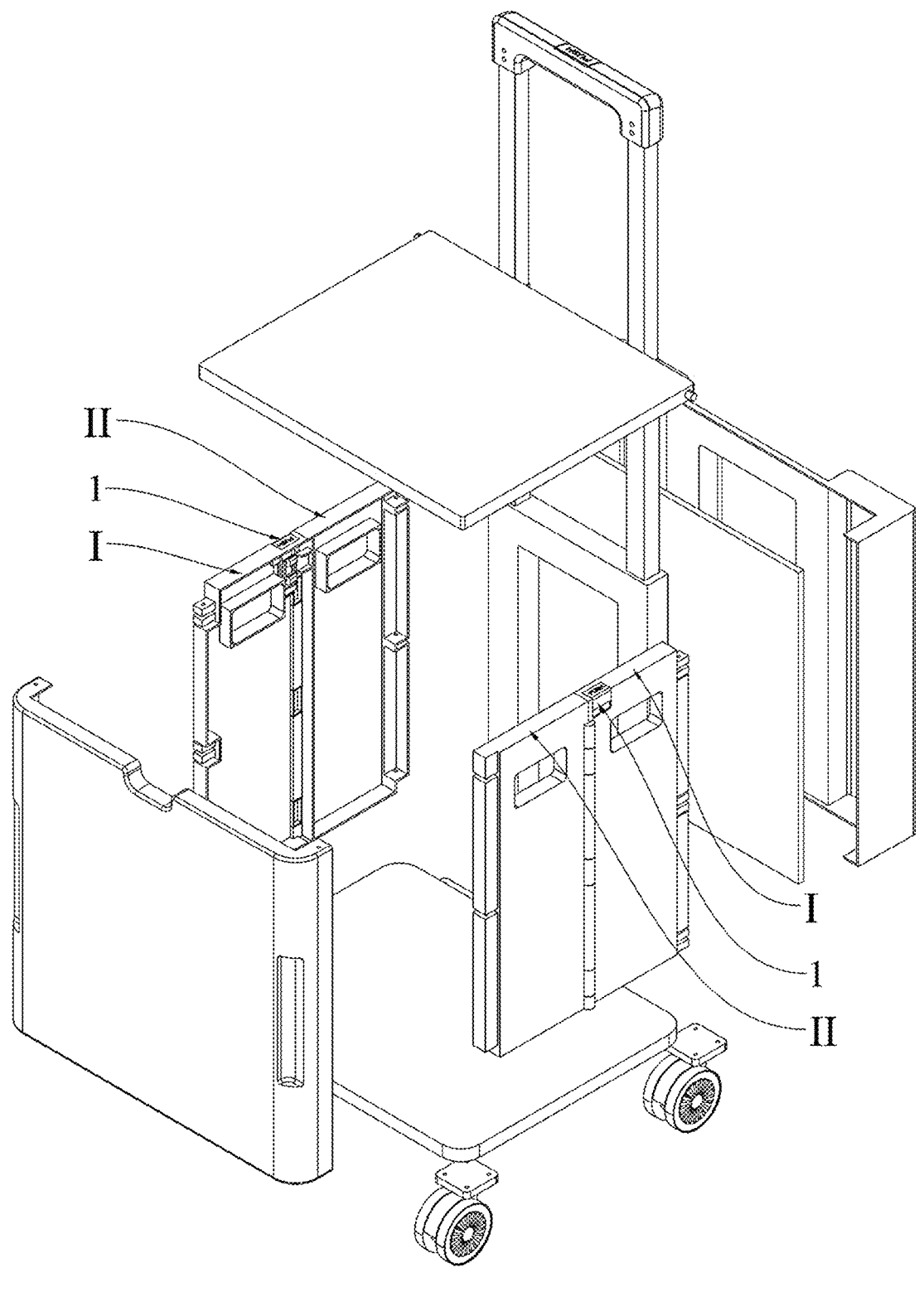
FIG. 10 is an exploded view of the folding cart according to an embodiment of the present disclosure.

As shown in FIG. 9 and FIG. 10, a folding cart includes a locking device and a pair of oppositely disposed side panels. Each of the side panels includes first panel body I and second panel body II hinged to each other. Certainly, the folding cart further includes a base panel and a pair of non-foldable side panels, named baffles. The pair of baffles are oppositely disposed and are hinged to the adjacent side panels, respectively, enclosing a side structure of the folding cart. The base panel is hinged to a bottom of one of the baffles. During folding, the base panel is rotated upward to fit against one of the baffles, and the first panel body I and the second panel body II forming the pair of side panels can rotate relative to each other and fold inward. The mounting method and operation of the locking device are as described above. Specifically, when the side panel is in the locked state, the user pushes the movable portion 11, such that the movable portion 11 moves downward to the pushed state. At this time, the fixing hooks 12 completely disengage from the fixing arms 22, and the side panel switches to the unlocked state. The first panel body I and the second panel body II can rotate freely. When the first panel body I or the second panel body II is rotated to a certain angle, the movable portion 11 is released, such that the movable portion 11 is elastically reset. When the side panel is in the unlocked state, the first panel body I or the second panel body II is rotated until the top inclined surface 122 of the fixing hook 12 contacts the fixing arm 22. Then, the first panel body I or the second panel body II is further rotated to the same plane. During this process, the fixing arm 22 moves along the inclined surface 122 of the fixing hook 12. The fixing hook 12 is pushed downward to the pushed state by the squeezing action of the fixing arm 22. After the fixing arm 22 passes a highest point of the fixing hook 12, the movable portion 11 is elastically reset, and the fixing arm 22 is engaged with the fixing hook 12.

It should be understood that in the description of the present disclosure, terms such as "first" and "second" are used merely for a descriptive purpose, and should not be construed as indicating or implying relative importance, or implicitly indicating the number of indicated technical features. Thus, features defined with "first" and "second" may explicitly or implicitly include one or more of the features. In the description of the present disclosure, "multiple" means two or more, unless otherwise specifically defined.

In the present disclosure, unless otherwise clearly specified, the terms "installation", "interconnection", "connection" and "fixation" etc. are intended to be understood in a broad sense. For example, the "connection" may be a fixed connection, removable connection or integral connection; may be a mechanical connection or electrical connection; may be a direct connection or indirect connection using a medium; and may be a communication or interaction between two elements. Those of ordinary skill in the art may understand specific meanings of the above terms in the present disclosure based on a specific situation.

In the present disclosure, unless otherwise explicitly specified, when it is described that a first feature is "above" or "below" a second feature, it indicates that the first and second features are in direct contact or the first and second features are in indirect contact through an intermediate feature. In addition, when it is described that the first feature is "over", "above" and "on" the second feature, it indicates that the first feature is directly or obliquely above the second feature, or simply indicates that an altitude of the first feature is higher than that of the second feature. When it is described that a first feature is "under", "below" or "beneath" a second feature, it indicates that the first feature is directly or obliquely under the second feature or simply indicates that the first feature is lower than the second feature.

In the description of this specification, the description with reference to the terms such as "one embodiment", "some embodiments", "example", "specific example" or "some examples" means that specific features, structures, materials or characteristics described in connection with the embodiment or example are included in at least one embodiment or example of the present disclosure. In this specification, the schematic expression of the above terms is not necessarily directed to the same embodiment or example. Furthermore, the specific features, structures, materials, or characteristics described may be combined in a suitable manner in any one or more of embodiments or examples. In addition, those skilled in the art may combine different embodiments or examples described in this specification and characteristics of the different embodiments or examples without mutual contradiction.

Although the embodiments of the present disclosure have been illustrated and described above, it will be appreciated that the above embodiments are illustrative and should not be construed as limiting the present disclosure. Changes, modifications, substitutions, and variations can be made to the above embodiments by a person of ordinary skill in the art within the scope of the present disclosure.

What is claimed is:

1. A folding cart comprising a locking device, the locking device comprising: a button mechanism and a locking member, wherein the button mechanism comprises a movable portion and a plurality of fixing hooks disposed on the movable portion; the movable portion is slidably disposed on a first panel body of the folding cart; the locking member is connected to a second panel body of the folding cart; and the first panel body is hinged to the second panel body;

the movable portion is configured to switch between an initial state and a pushed state; when the movable portion is in the initial state, the plurality of fixing hooks are engaged with the locking member, and the first panel body and the second panel body are coplanar, allowing the first panel body and the second panel body of the folding cart to form a rigid side panel; and when the movable portion is in the pushed state, the plurality of fixing hooks move along a sliding direction of the movable portion and disengage from the locking member, allowing the first panel body and the second panel body to rotate relative to each other and fold;

wherein the locking member comprises a fixing plate and a plurality of fixing arms; the fixing plate is connected to the second panel body; and first ends of the plurality of fixing arms are connected to the fixing plate; and when the movable portion is in the initial state, the plurality of fixing arms are engaged with the plurality of fixing hooks in a one-to-one correspondence, and the plurality of fixing arms abut against the first panel body.

2. The folding cart comprising the locking device according to claim 1, wherein second ends of the plurality of fixing arms are connected by a reinforcing member.

3. The folding cart comprising the locking device according to claim 1, wherein the first panel body is provided with an elastic member; the elastic member abuts against the movable portion; and the elastic member is configured to drive the movable portion to reset from the pushed state to the initial state.

4. The folding cart comprising the locking device according to claim 3, wherein the movable portion is provided with a first restricting portion; and when the movable portion is in the initial state, the first restricting portion abuts against the first panel body to restrict further movement of the movable portion.

5. The folding cart comprising the locking device according to claim 3, wherein the movable portion is provided with a second restricting portion; and when the movable portion is in the pushed state, the second restricting portion abuts against the first panel body to restrict further movement of the movable portion.

6. The folding cart comprising the locking device according to claim 1, wherein the movable portion comprises a sliding plate; the first panel body is provided with a sliding groove; and the sliding plate is slidably connected to the sliding groove.

7. The folding cart comprising the locking device according to claim 6, wherein the movable portion further comprises a guide plate; the first panel body is provided with a guide groove; and the guide plate is slidably connected to the guide groove.

8. A folding cart comprising a locking device, the locking device comprising: a button mechanism and a locking member, wherein the button mechanism comprises a movable portion and a plurality of fixing hooks disposed on the movable portion; the movable portion is slidably disposed on a first panel body of the folding cart; the locking member is connected to a second panel body of the folding cart; and the first panel body is hinged to the second panel body;

the movable portion is configured to switch between an initial state and a pushed state; when the movable portion is in the initial state, the plurality of fixing hooks are engaged with the locking member, and the first panel body and the second panel body are coplanar, allowing the first panel body and the second panel body of the folding cart to form a rigid side panel; and when the movable portion is in the pushed state, the plurality of fixing hooks move along a sliding direction of the movable portion and disengage from the locking member, allowing the first panel body and the second panel body to rotate relative to each other and fold;

wherein the first panel body is provided with an elastic member; the elastic member abuts against the movable portion; and the elastic member is configured to drive the movable portion to reset from the pushed state to the initial state; and wherein a fixing hook of the plurality of fixing hooks is connected to the movable portion to form a U-shaped groove; and a top of the fixing hook of the plurality of fixing hooks forms an inclined surface.

9. A folding cart comprising a locking device, the locking device comprising: a button mechanism and a locking member, wherein the button mechanism comprises a movable portion and a plurality of fixing hooks disposed on the movable portion; the movable portion is slidably disposed on a first panel body of the folding cart; the locking member is connected to a second panel body of the folding cart; and the first panel body is hinged to the second panel body;

the movable portion is configured to switch between an initial state and a pushed state; when the movable portion is in the initial state, the plurality of fixing hooks are engaged with the locking member, and the first panel body and the second panel body are coplanar, allowing the first panel body and the second panel body of the folding cart to form a rigid side panel; and when the movable portion is in the pushed state, the plurality of fixing hooks move along a sliding direction of the movable portion and disengage from the locking member, allowing the first panel body and the second panel body to rotate relative to each other and fold;

wherein the first panel body is provided with an elastic member; the elastic member abuts against the movable portion; and the elastic member is configured to drive the movable portion to reset from the pushed state to the initial state;

wherein the movable portion is provided with a second restricting portion;

when the movable portion is in the pushed state, the second restricting portion abuts against the first panel body to restrict further movement of the movable portion; and wherein the button mechanism further comprises a push portion; the push portion is disposed on the second restricting portion; a top surface of the first panel body is provided with a recess; and the push portion is disposed in the recess.

* * * * *